United States Patent
Fisher

(10) Patent No.: US 7,817,365 B2
(45) Date of Patent: Oct. 19, 2010

(54) ADDRESS MARK DETECTION WITH ERROR THRESHOLD THAT VARIES WITH TIMING JITTER

(75) Inventor: Matthew Fisher, Marlboro, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 974 days.

(21) Appl. No.: 11/640,706

(22) Filed: Dec. 18, 2006

(65) Prior Publication Data

US 2007/0165319 A1    Jul. 19, 2007

Related U.S. Application Data

(60) Provisional application No. 60/759,807, filed on Jan. 18, 2006.

(51) Int. Cl.
*G11B 5/09* (2006.01)
(52) U.S. Cl. ....................................................... 360/51
(58) Field of Classification Search ........................ None
See application file for complete search history.

(56) References Cited

U.S. PATENT DOCUMENTS

| | | | |
|---|---|---|---|
| 5,825,568 A * | 10/1998 | Lee | 360/51 |
| 5,999,110 A | 12/1999 | Blaum et al. | 341/59 |
| 6,810,485 B2 | 10/2004 | McEwen et al. | 713/503 |
| 2005/0013027 A1 | 1/2005 | Ehrlich | 360/29 |
| 2005/0068651 A1 | 3/2005 | Blaum et al. | 360/48 |
| 2005/0094531 A1 | 5/2005 | Verboom et al. | 369/59.25 |
| 2005/0243455 A1 | 11/2005 | Annampedu | 360/46 |
| 2005/0264922 A1 | 12/2005 | Erden et al. | 360/79.04 |
| 2006/0023602 A1 | 2/2006 | Rauschmayers | 369/59.19 |
| 2006/0176599 A1 | 8/2006 | Semba | 360/51 |

* cited by examiner

*Primary Examiner*—Daniell L Negrón
(74) *Attorney, Agent, or Firm*—Westman, Champlin & Kelly, P.A.

(57) ABSTRACT

An apparatus includes an address mark detector having an address mark output. The address mark output is indicated as erroneous if errors in a detected address mark exceed an error threshold function. The error function has a variation as a function of a difference between a detected address mark time and a reference address mark time.

14 Claims, 5 Drawing Sheets

ADDRESS MARK DETECTION WITH ERROR THRESHOLD THAT VARIES WITH TIMING JITTER

CROSS-REFERENCE TO RELATED APPLICATION

This application claims the benefit of U.S. Provisional Application 60/759,807 filed on Jan. 18, 2006 for inventor Matthew Fisher and entitled "Address Mark Detection."

FIELD OF THE INVENTION

The present invention relates to data storage systems.

BACKGROUND OF THE INVENTION

The head positioning system in many disk storage devices relies on reading embedded servo fields on the storage media. Typically the servo fields are positioned in radial "spokes" at equally spaced intervals at boundaries of sectors on the storage media. The spokes typically have a shape that corresponds with an arced path of a read/write head as it moves across the storage media surface. The embedded servo fields typically include an address mark which identifies a particular sector on the storage media and read/write head position data which identifies a particular track on the disc. The positioning system depends on accurate reading of the position data within the embedded servo field.

Under ideal, jitter-free and noise-free operating conditions, the read/write head senses an address mark after a fixed, nominal delay time since the last address mark. Under many operating conditions, however, the speed of the rotating media has significant jitter, and consequently the delay time between address marks has jitter. An address mark detector must be enabled over a time range wide enough to account for jitter in order to read address marks under these operating conditions. Noise is also present in reading the address mark, and there can be a failure to recognize the address mark because of the noise. With the combined effects of jitter and noise, there is a possibility of failing to detect an address marks, and also a possibility of erroneously reading an address mark. Either of these failures results in time delays in repositioning the read/write head for re-reading, and degraded performance of the disc drive for the user.

A method and apparatus are needed to perform address mark detection in a manner that indicates failures to detect address marks and that reduces erroneously read address marks. Embodiments of the present invention provide solutions to these and other problems, and offer other advantages over the prior art.

SUMMARY OF THE INVENTION

Disclosed is an apparatus that includes an address mark detector having an address mark output. The address mark output is indicated as erroneous if errors in a detected address mark exceed an error threshold function. The error function has a variation as a function of a difference between a detected address mark time and a reference address mark time.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
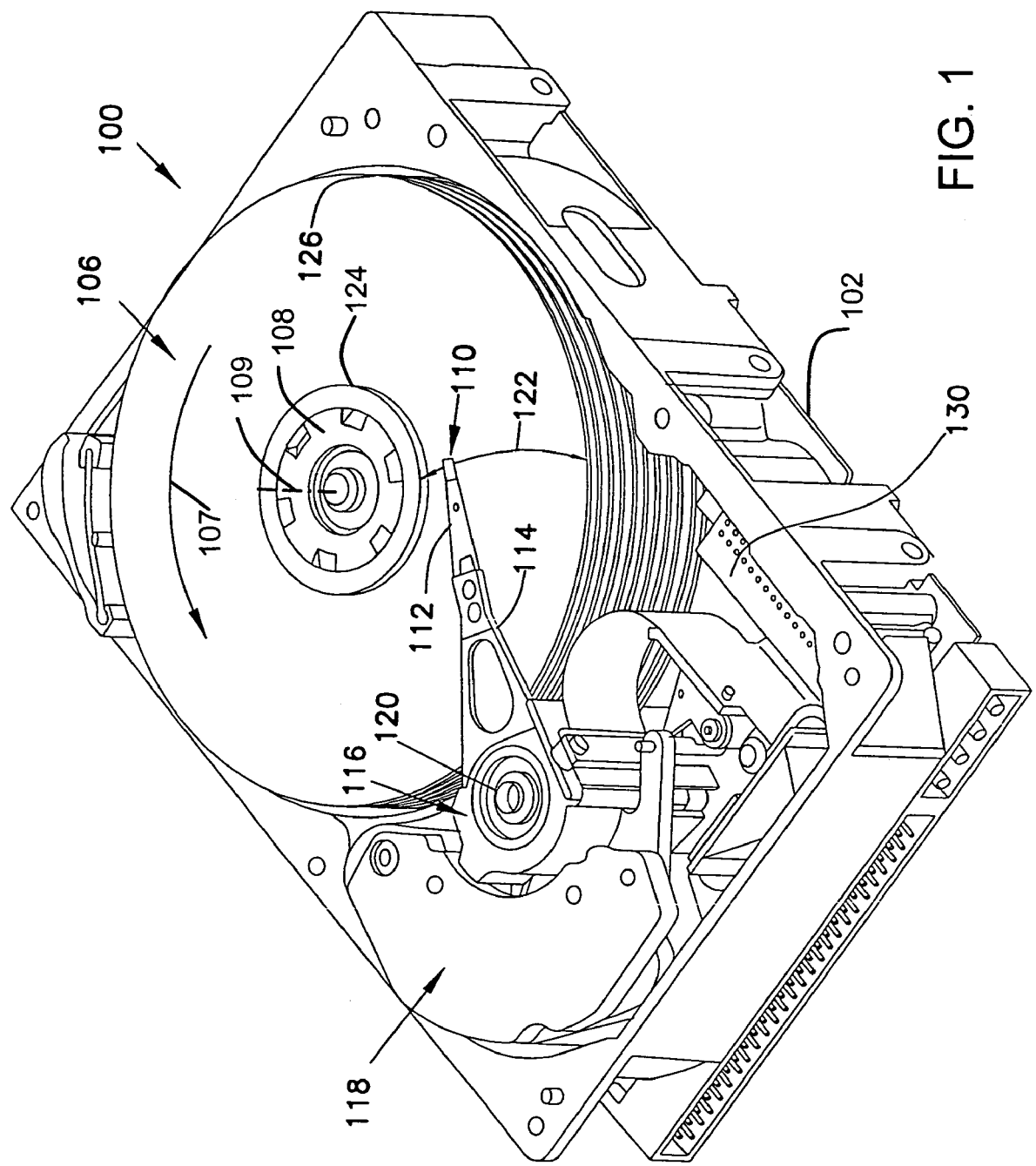
FIG. 1 is an isometric view of a disc drive.

In the embodiments described below, an address mark detector has an address mark output that is indicated as erroneous if errors in a detected address mark exceed an error threshold function from an error threshold function generator. The error threshold function varies as a function of a difference between a detected address mark time and a nominal address mark time. The error threshold function permits a larger number of errors closer to the nominal address mark time, and permits a decreasing number of errors farther from the nominal address mark time.

In order to detect the address mark, an address mark detector is enabled over an address mark window. The address mark window opens early enough and is kept open late enough to cover a jitter range that includes the highest and lowest expected media spin speeds. With the wide address mark window, the address mark detector is enabled over both preamble and position data. Because of noise, the address mark detector sometimes fails to detect the address mark.

This can lead to either a missed address mark and ensuing positioning system disturbance, or much worse, incorrectly detecting an address mark.

The address mark within the servo field is useful for at least three purposes: (1) the end of the address mark demarks the beginning of the position data, (2) detection of address mark provides some assurance of the integrity of the position data that follows and (3) detection of address mark provides a timing reference for detecting the next servo field to spin past the head.

When an address mark is incorrectly detected in position data, the demarcation of position data is wrong yielding bad position information, and the reference timing for the next address mark detection is exceptionally late, which can cause misdetection on the next and following spokes. This can lead to catastrophic errors in the positioning system.

To reduce the possibility of missing address mark detection, current hardware provides for ignoring a fixed number of errors in the address mark pattern regardless of its timing. With a fixed number of errors allowed, in severe noise conditions address marks with a larger number of errors can be missed and then the likelihood of misdetected address mark in position data is even higher than before.

In the embodiments described below, an error threshold function generator is used to reduce miss-detected address marks in position data. Recognizing that the media spin speed in more likely to be nominal than at either extreme, the error threshold function tolerates different numbers of address mark errors as a function of the deviation from nominal speed. More errors in the address mark are allowed at the nominal timing. Reduced number of errors are tolerated at the extremes of the timing window. The overall address mark misdetection rate is reduced while still allowing better detection in a noisy system.

So, instead of a circuit for address detection with one input, X=address data pattern, and one fixed error threshold, the embodiments described below provide a function generator block with two inputs, X=address data pattern, and an address mark time M from previous address mark detection, along with a threshold function T(M). Various methods can be used to implement T(M), including a register file indexed by an offset and a scaled version of M. A number of registers can hold different mismatch levels and corresponding registers can hold timing windows within which each threshold is used. If N is the nominal address mark to address mark time, then typically T(M) would be set largest for an interval [M−e, M+e] and T(M) would take smaller values for regions outside this interval.

The likelihood of detecting a false address mark is reduced. Those address marks which have errors in bits that are higher than the threshold function are indicated as erroneous. Servo error rates are reduced which leads to better disc drive performance, fewer long delays for recovery, and fewer revectored data blocks.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). The disc drive 100 illustrated in FIG. 1 is merely exemplary, and other types of data storage devices can be used as well.

Figure 2:
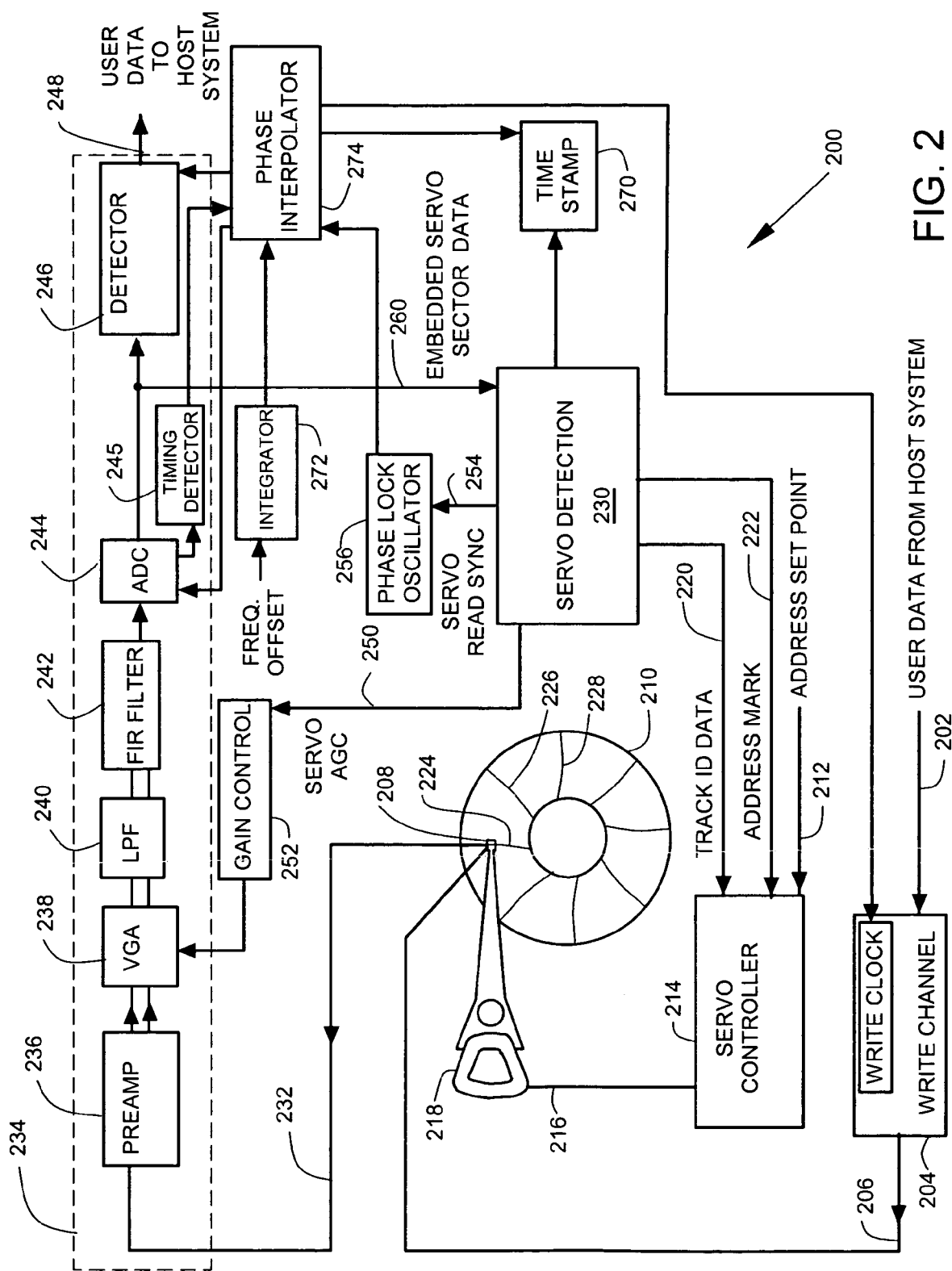
FIG. 2 illustrates a block diagram of circuitry in a disc drive.

FIG. 2 illustrates a block diagram of circuitry 200 in a disc drive. A host computer system (not illustrated) provides user data 202 to be stored or written. The user data 202 couples to a write channel circuit 204. During a write mode of operation, the write channel circuit 204 encodes the user data 202 for writing and provides an encoded write output 206. The write output 206 couples to a write portion of a read/write head 208. The write portion of the read/write head writes the encoded data in data sectors on a storage disc 210.

The host computer system also provides an address set point 212 to a servo controller block 214. The servo controller block 214 can be implemented using hardware, firmware or a combination of hardware and firmware. The address set point 212 includes a track number and sector number. The servo controller block 214 provides a positioning output 216 to a positioner 218 that positions the read/write head 208 on a desired address (sector and track) on the storage disc 210 for writing encoded user data at the desired address.

The servo controller 214 receives detected track ID data 220 and detected address mark data 222 from a servo detection block 230. The servo detection block 230 can be implemented in hardware, firmware, or a combination of hardware and firmware. The servo detection block 230 is described in more detail below in connection with examples illustrated in FIGS. 4-5. The track ID data 220 and the address mark data 222 indicate the track and sector over which the read/write head 208 is aligned. The track ID data 220 and address mark data 222 are obtained by reading embedded servo data from servo tracks (such as servo tracks 224, 226, 228) on the storage disc 210. An exemplary servo track is described in more detail below in connection with FIG. 3.

During a read mode of operation, the servo controller 214 receives an address set point 212 that indicates the track and sector where data is to be read. The servo controller 214 positions the read/write head 208 on the desired sector and track according to the address set point. The read/write head 208 reads track ID and servo ID portions of the address from the embedded servo data on the disc 210 The control of the positioning is closed loop control based on feedback of the track ID and sector ID. Once the read/write head 208 is aligned and tracking with the set point sector and track, then encoded user data is read from the storage disc 210.

During a read operation, encoded user data 232 is coupled from the read/write head 208 to an input of a read channel 234. In the example shown in FIG. 2, the read channel 234 comprises a preamplifier 236, a variable gain amplifier 238, a low pass filter 240, a finite impulse responses (FIR) filter 242, an analog-to-digital converter (ADC) 244, and a detector circuit 246 that are connected in cascade as illustrated. The read channel 234 comprises a timing detector 245 that receives timing data from the ADC 244. A channel output 248 of the read channel 234 provides decoded user data. The decoded user data is provided to the host system.

The ADC 244 provides embedded servo sector data 260 to the servo detection block 230. The servo detection block 230 detects multiple portions of the embedded servo sector data 260. During the time that a servo sector is being read, the servo detection block 230 provides a servo AGC output 250 to a gain control circuit 252. The gain control circuit 252 controls the gain of the variable gain amplifier 238 so that the ADC 244 is operating within its dynamic range. During the time that the servo sector is being read, the servo detection block 230 provides a servo read sync output 254 to a phase lock oscillator 256. The phase lock oscillator 256 provides a timing reference (also called a recovered data clock) that is provided to a phase interpolator 274 to keep operation of the phase interpolator 274 synchronized with the incoming read sync data. During the time that a servo sector is being read, the servo detection block 230 detects track ID data and sector ID data.

The timing detector 245, the phase interpolator 274 and an integrator 272, taken together, comprise a disc locked clock (DLC) block. The disc locked clock (also called disk-locked clock) adjusts channel clocking to allow the read/write channels to function over a range of disc speeds. The integrator 272 receives a frequency offset value from firmware. The frequency offset value from firmware is useful for compensation for variations encountered with pre-written discs. The integrator 272 provides a control input to the phase interpolator 274. The phase interpolator 274 provides a synchronization clock to the ADC 244. The ADC 244 provides a timing output to the timing detector 245. The timing detector 245 provides a clock to the phase interpolator 274. The phase interpolator 274 provides a clock (or clocks) to the detector 246, the write channel 204 and a time stamp block 270.

The circuitry 200 is an exemplary disc drive circuit that uses a servo detection block 230. Other variations of disc drive circuits can be used with the servo detection block 230. The servo detection block 230 is described in more detail below in connection with examples illustrated in FIGS. 4-5.

Figure 3:
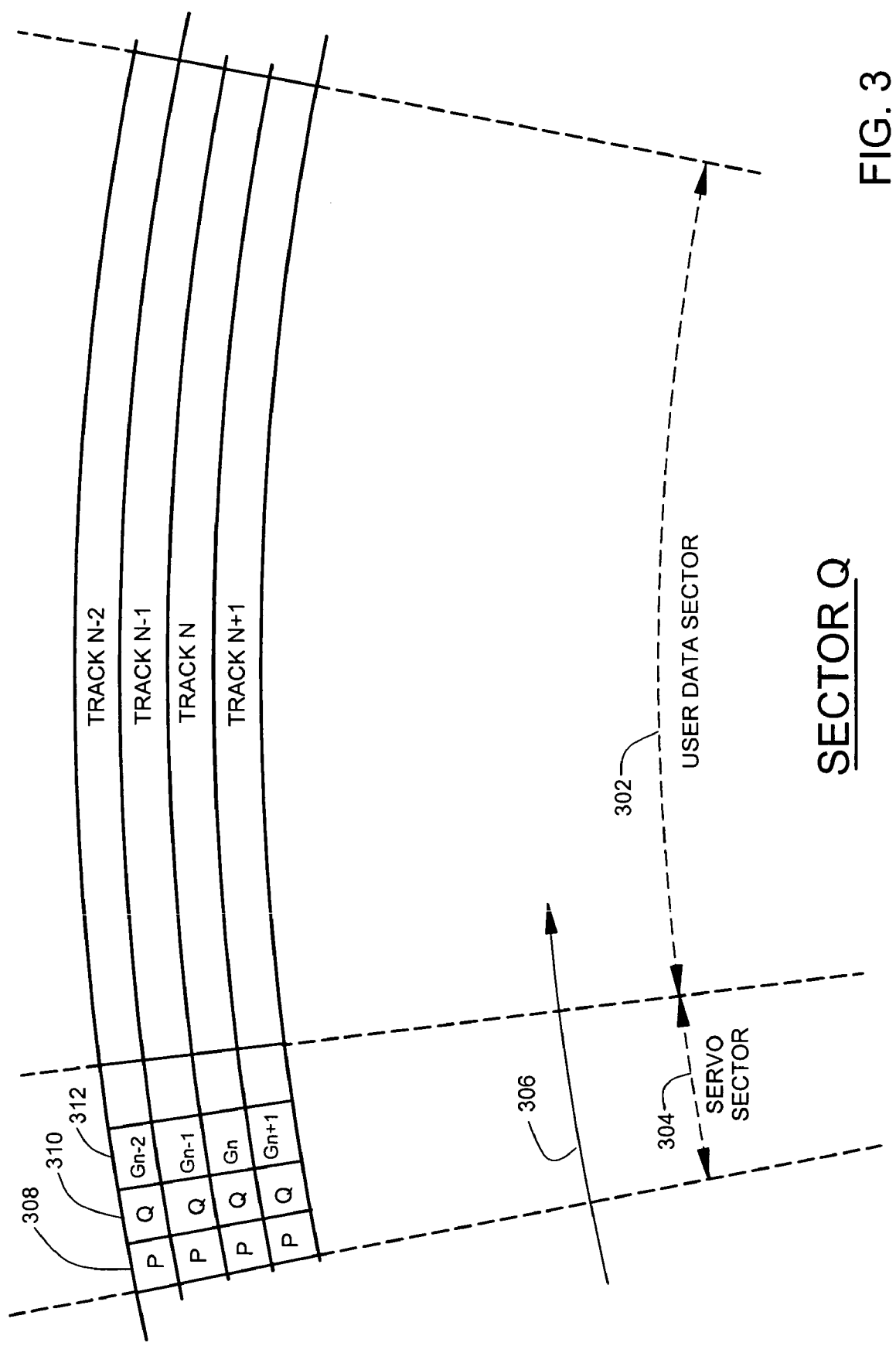
FIG. 3 illustrates a portion of a sector on a storage media disc.

FIG. 3 illustrates a portion of a sector Q on a storage media disc such as disc 210 in FIG. 2. The sector Q comprises a user data sector 302 and an embedded servo sector 304. There are a large number of concentric (or spiral) tracks, such as tracks N−2, N−1, N, N+1 in the sector Q. Each track stores user data in the user data sector 302 and stores embedded servo data in the servo sector 304.

A read/write head (such as read/write head 208) passes over the sector Q in a direction indicated by arrow 306 and sequentially reads the embedded servo data for a track. Each track includes preamble data P 308 which is read first. The preamble data is the same data pattern for all data tracks. The preamble data is used for synchronization of a data clock (such as phase lock oscillator 256 in FIG. 2) and for adjusting AGC (such as servo AGC 250 in FIG. 2) before beginning reading sector number Q at 310 and Gray coded track number data G at 312. For a given sector, the sector number data is the same data pattern for all tracks. The sector number Q at 310 identifies sector Q. The track number data 312 is a Gray code representing the track number. Each track has a different Gray code. Gray code is used for the track number to reduce errors in reading a track number when the read head is slewing across a boundary between two adjacent tracks as in a seek operation. Other servo data such as dibit, tribit or frequency patterns and spaces can also be included in the embedded servo sector 304.

Figure 4:
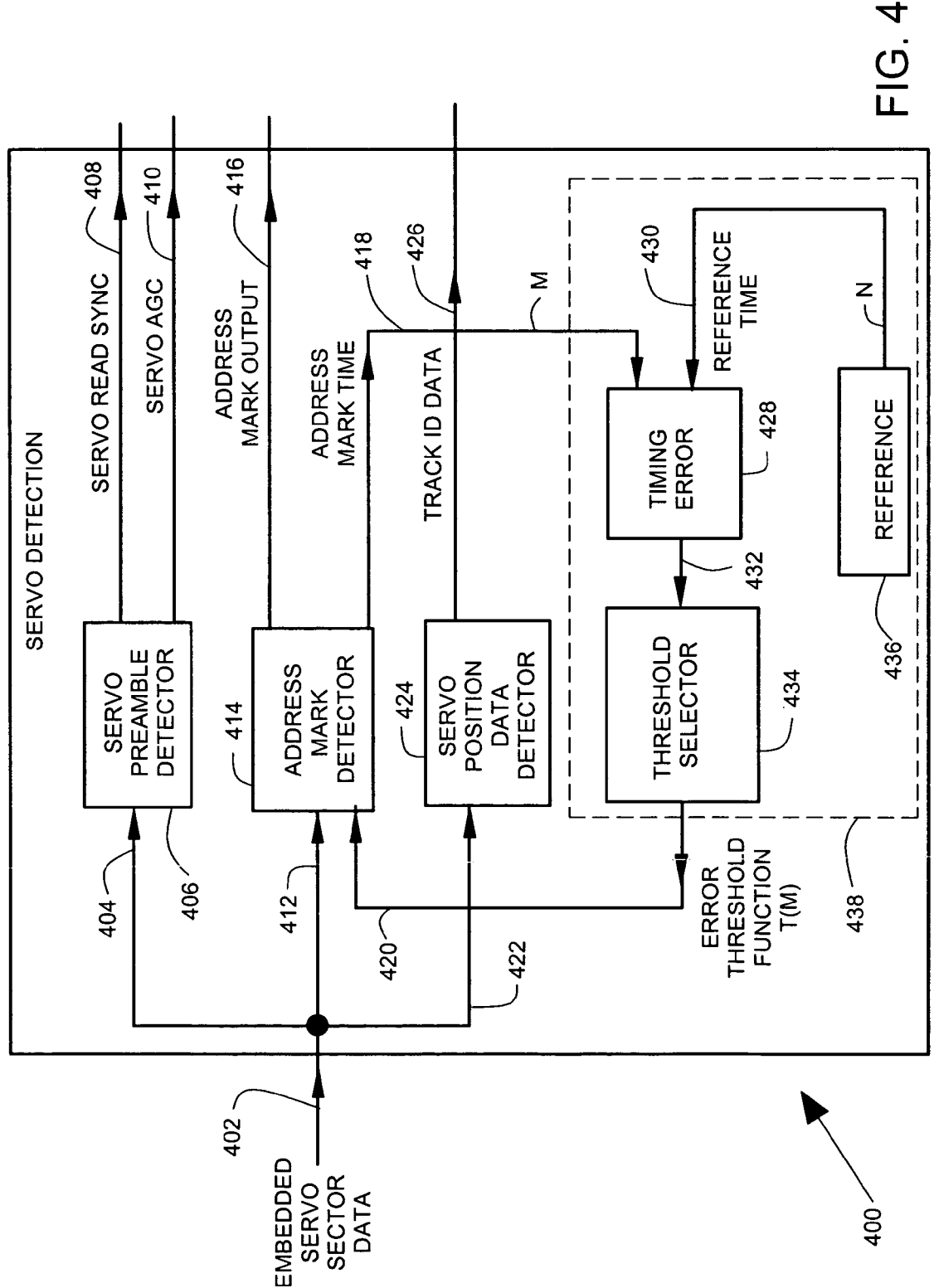
FIG. 4 illustrates a servo detection block.

FIG. 4 illustrates a servo detection block 400. The servo detection block 400 can be used, for example in the disc drive circuit 200 shown in FIG. 2. Embedded servo sector data is received at servo detection block input 402.

The embedded servo sector data is coupled from input 402 along line 404 to servo preamble detector 406. The servo preamble detector 406 detects the preamble data in the servo sector data. The servo preamble detector 406 generates a servo read sync output 408 that represents the synchronization of the preamble. The servo read sync output 408 provides a timing reference that is coupled to a phase lock loop (such as phase lock loop 256 in FIG. 2). The servo preamble detector 406 generates a servo automatic gain control (AGC) output 410. The servo AGC output 410 represents the amplitude of the sensed preamble data. The servo AGC output 410 couples to a gain control circuit (such as gain control circuit 252 in FIG. 2).

The embedded servo sector data is coupled from input 402 along line 422 to servo position data detector 424. The servo position data detector 424 detects the servo position data (Gray-coded track number) in the servo sector data. The servo position data detector 424 generates a track ID data output 426 that represents the detected track number. The track ID data output 426 provides a representation of the track number that the read/write head is reading to a servo controller (such as servo controller 214 in FIG. 2).

The embedded servo sector data is coupled from input 402 along line 412 to address mark detector 414. The address mark detector 414 detects the sector address data in the servo sector data. The address mark detector 412 generates an address mark output (sector ID data output) 416. The address mark output 416 couples to a servo controller (such as servo controller 214 in FIG. 2). The servo address mark detector 414 generates an address mark time output 418. The address mark time output 418 indicates a time at which the servo address mark is detected by the servo address mark detector 414.

The address mark detector 414 receives an error threshold function 420. The error threshold function 420 is not a fixed function, but varies as a function of timing error. The address mark output 416 provide selected sector ID data (address mark data), but does not provide all sector ID data that is received by the servo address mark detector 414. The servo mark address detector 414 indicates the address mark output 416 as erroneous when the detected sector ID data includes errors that exceeds the current error threshold function 420. In one embodiment, the indicating of the address mark as erroneous comprises suppressing the address mark. The address mark can be suppressed by blanking or by providing an output that indicates that errors exceed the threshold. In another embodiment, indicating the address mark as erroneous comprises repeating the last non-erroneous address mark after adjusting the repeated address mark output for expected address travel of the head based on time since the last non-erroneous address mark.

The address mark output 416 is indicated as erroneous for an interval long enough to prevent use of the undesired address mark data. The address mark detector 414 compares a number of errors found in detected sector ID data to the threshold function 420 and suppress sector ID data when the number of errors found exceeds the threshold function 420. The threshold function 420 is described in more detail below in an example threshold function illustrated in FIG. 5.

The address mark time output 418 couples to a timing error comparator 428. The timing error comparator 428 also receives a reference time output 430 from a reference time source 436. The timing reference value represents a nominal time for detecting an address mark. In one embodiment, the reference time source is compensated for repeatable timing errors.

In one embodiment, the reference time output 430 represents a fixed expected time interval between address marks based on the nominal design disc rotation speed (RPM) of the disc. In another embodiment, the reference time output 430 represents a variable expected time interval between address marks based on current detected disc rotation speed. The timing error comparator 428 generates a comparator output 432 that represents timing error of the detected address mark with respect to the reference time output 430. The comparator output 432 couples to a threshold selector 434. The threshold selector 434 generates the threshold function 420. The threshold function 420 coupled to the servo address mark detector 414. The servo address mark detector 414 selectively controls indicating of the address mark as erroneous depending on the threshold function 420. The threshold selector 434, the timing error comparator 428 and the reference generator 436, taken together, comprise a function generator 438. The threshold function 420 is described in more detail below in an example illustrated in FIG. 5.

In one embodiment, timing of the block 400 is controlled by the disc locked clock. As shown in FIG. 2, the embedded servo sector data 260 is clocked by the ADC 244, and the timing of the ADC 244 is controlled by the disc locked clock.

Figure 5:
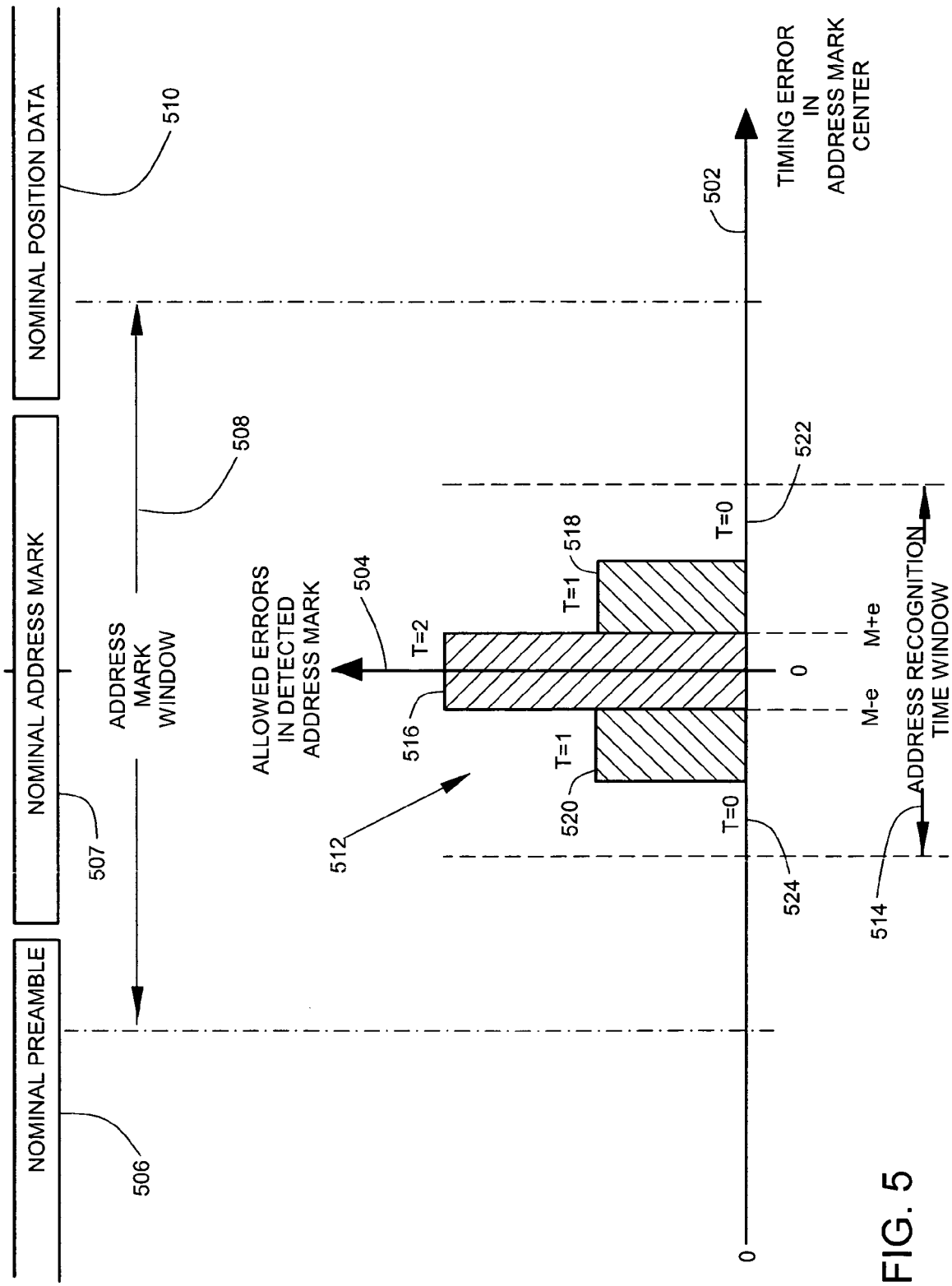
FIG. 5 illustrates an example of a threshold function.

FIG. 5 illustrates an example of a threshold function. A horizontal axis 502 represents timing error (such as timing error output 432 in FIG. 4). In the example shown in FIG. 5, the timing error shown is the error in timing of an address mark center point. A vertical axis 504 represents the amplitude of the threshold function, in other words, the number of errors that the address mark data (such as data 412) can have without indicating an address mark output (such as address mark output 416 in FIG. 4) as erroneous. An address mark window 508 is provided that is wider than a nominal address mark 507 detected at a nominal time with no jitter. The address mark window 508 extends over portions of the nominal preamble 506 and the nominal position data 510 in order to account for jitter of the address mark away from the nominal timing. The window 508 is wider than the width of an address mark to allow for detection of an address mark that is early or late due to jitter.

When an address mark is detected, the center mark of the address is compared to a threshold function 512. The threshold function 512 has a different function value depending on the timing of the center mark. The threshold function 512 is defined within an address recognition time window 514. The address recognition time window 514 defines a time window outside of which address marks will not be detected, even if the address mark is error free. In the particular example of a threshold function 512 illustrated, if the timing of the address mark is within a narrow window between (M−e) and (M+e), then up to 2 errors (as indicated at 516) are allowed in an address mark without indicating the address mark as erroneous. As the timing error increases, then up to 1 error (as indicated at 518, 520) is allowed in an address mark without indicating the address mark as erroneous. If the timing error increases further, then no errors (as indicated at 522, 524) are allowed in an address mark without indicating the address mark as erroneous. In the embodiment illustrated in FIG. 5, the error threshold function permits a larger number of errors closer to the nominal time, and permits a decreasing number of errors farther from the nominal time.

While FIG. 5 illustrates a single threshold function, multiple threshold functions are also contemplated. A user can select one of the multiple threshold functions depending on the requirements of the user's application for speed and errors.

In one embodiment, a block comprises a set of first registers storing a set of error thresholds, and a corresponding set of second registers storing multiple address timing error limits. Each second register is associated with one of the first registers in a function relationship. An address mark is indicated as erroneous if errors in a detected address mark exceed an error threshold in a selected first register. A block selects one of the second registers that matches an address mark timing. The match controls the selection of the first register as an error threshold for indicating as erroneous.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the embedded servo system while maintaining substantially the same functionality without departing from the scope and spirit of the present invention. In addition, although the preferred embodiment described herein is directed to embedded servo systems for disc drives, it will be appreciated by those skilled in the art that the teachings of the present invention can be applied to embedded servo for ferroelectric probe storage, without departing from the scope and spirit of the present invention.

What is claimed is:

1. An apparatus, comprising:
   an address mark detector having an address mark output, the address mark output being indicated as erroneous when errors in a detected address mark exceed an error threshold function, the error threshold function having a variation as a function of a difference between a detected address mark time and a reference address mark time.

2. The apparatus of claim 1 wherein the error threshold function permits a larger number of errors closer to the reference address mark time, and permits a decreasing number of errors farther from the reference address mark time.

3. The apparatus of claim 1 wherein the address mark detector comprises an address mark time output, and the apparatus comprises a function generator that comprises:
   a reference circuit providing the reference address mark time;
   a timing error comparator that receives the reference address mark time and the address mark time output, and that generates a comparator output; and
   a threshold selector that receives the comparator output and that generates the error threshold function.

4. The apparatus of claim 1 wherein the indicating of the address mark as erroneous comprises suppressing the address mark output.

5. The apparatus of claim 4 wherein the suppressing of the address mark output comprises repeating a preceding unsuppressed address mark that is adjusted for head travel.

6. The apparatus of claim 1 wherein the detected address mark has timing that is controlled by a disc locked clock.

7. A method, comprising:
   detecting a number of bit errors and a time position of a detected address mark;
   calculating an error threshold function as a function of a difference between the time position of the address mark and a reference address mark time; and
   providing an address mark output that is indicated as erroneous if the number of bit errors exceed the error threshold function.

8. The method of claim 7, comprising:
   shaping the error threshold function to permit a larger number of bit errors closer to the nominal time, and to permit a decreasing number of errors farther from the nominal time.

9. The method of claim 7, comprising:
   providing an address mark time output;
   providing a reference time output; and
   generating a comparison of the address mark time output and the reference time output.

10. The method of claim 7, comprising:
    controlling timing of the address mark detector with a disc locked clock.

11. The method of claim 7, comprising:
    generating an address mark time output;
    providing a reference time output;
    generating a comparator output that represents timing error of the address mark time output with respect to the reference time output; and
    generating the error threshold function as a function of the comparator output.

12. The method of claim 7 wherein multiple error threshold functions are generated, and one of the multiple error threshold functions is selectable for use.

13. The method of claim 7 wherein the indicating as erroneous comprises suppressing the address mark output.

14. The method of claim 7 wherein the indicating as erroneous comprises repeating a preceding non-erroneous address mark that is adjusted for head travel.

* * * * *